United States Patent [19]
Braun

[11] Patent Number: 6,075,632
[45] Date of Patent: Jun. 13, 2000

[54] OPTICAL NOISE MONITOR

[75] Inventor: David M. Braun, Santa Rosa, Calif.

[73] Assignee: Hewlett-Packard Company, Palo Alto, Calif.

[21] Appl. No.: 08/979,463

[22] Filed: Nov. 26, 1997

[51] Int. Cl.[7] ............................................ H04J 14/02
[52] U.S. Cl. ....................... 359/124; 359/127; 359/131; 359/634
[58] Field of Search .................... 359/127, 589, 359/124, 634, 131; 385/24, 27, 39

[56] References Cited

U.S. PATENT DOCUMENTS

| | | | |
|---|---|---|---|
| 4,244,045 | 1/1981 | Nosu et al. ................................. | 370/3 |
| 4,707,064 | 11/1987 | Dobrowolski et al. .............. | 350/96.19 |
| 4,768,849 | 9/1988 | Hicks, Jr. . | |
| 5,583,683 | 12/1996 | Scobey ..................................... | 359/127 |
| 5,920,411 | 7/1999 | Duck et al. .............................. | 359/127 |

FOREIGN PATENT DOCUMENTS

| | | | |
|---|---|---|---|
| 2014752 | 1/1979 | United Kingdom ........... | G02B 27/14 |

OTHER PUBLICATIONS

J. M. Vaughan MA, DPhil—"The Fabry—Perot Interferometer, History, Theory, Practice and Applications"; The Adam Hilger Series on Optics and Optoelectronics; Adam Hilger, Bristol and Philadelphia; pp. 235–253.

*Primary Examiner*—Leslie Pascal
*Assistant Examiner*—Vu T. Lieu
*Attorney, Agent, or Firm*—John L. Imperato

[57] ABSTRACT

An optical noise monitor measures noise power within narrow wavelength regions between channel signals of a dense wavelength division multiplexed (DWDM) signal. The noise monitor receives the DWDM signal and cascades the signal along a multipoint travel path where the signal is incident on a series of multi-pass filters. Each multi-pass filter selects a narrow, predefined wavelength region between channel signals of the DWDM signal. Noise power within the predefined wavelength region is detected and SNR is monitored by comparing the detected noise power to the power in the channel signal. According to a first preferred embodiment of the present invention, the noise monitor includes multi-pass filters that each have reflective surfaces to guide optical energy within a predefined wavelength region through multiple passes of an optical filter. According to a second preferred embodiment of the present invention, the noise monitor includes multi-pass filters each having a serial arrangement of multiple optical filters.

4 Claims, 3 Drawing Sheets

OPTICAL NOISE MONITOR

FIELD OF THE INVENTION

The present invention relates to monitoring signal-to-noise ratio of optical signals and, more particularly, to monitoring noise power within selected wavelength regions of optical signals within optical telecommunication systems.

BACKGROUND OF THE INVENTION

High data rates are achieved in optical telecommunication systems using dense wavelength division multiplexed (DWDM) signals. DWDM signals contain multiple channel signals each at a predefined channel wavelength. Typically, the channel signals are within a wavelength range defined by the flat gain region of erbium doped fiber amplifiers (EDFAs), a critical component of modern optical telecommunication systems. Performance of the EDFAs and other system components can be verified by monitoring signal-to-noise ratio (SNR) of each of the channel signals. One method of SNR monitoring involves measuring noise power within narrow wavelength regions between the predefined channel wavelengths and comparing the measured noise power to the power of each channel signal. Since the component channel signals within a DWDM signal may be spaced as closely as 25 GHz, measuring noise power between the channel signals requires highly selective filtering within the wavelength regions between the channel signals. An optical demultiplexing device, taught by Scobey in U.S. Pat. No. 5,583,683 is useful for monitoring power of the channel signals, but the device is not sufficiently selective to monitor noise power in the wavelength regions between closely-spaced channel signals.

SUMMARY OF THE INVENTION

An optical noise monitor constructed according to the preferred embodiments of the present invention measures noise power within narrow wavelength regions between channel signals of a dense wavelength division multiplexed (DWDM) signal. The monitor is physically compact and is suitable for integration into an optical telecommunication system for measuring signal-tonoise ratio (SNR) of channel signals. The noise monitor receives the DWDM signal and cascades the signal along a multipoint travel path where the signal is incident on a series of multi-pass filters. Each multi-pass filter selects a narrow, predefined wavelength region between channel signals of the DWDM signal. Noise power within the predefined wavelength region is detected and SNR is monitored by comparing the detected noise power to the power in the channel signal. Optical signals outside the passband of the multi-pass filter are reflected and directed to another multi-pass filter in the series which selects another of the predefined wavelength regions. According to a first preferred embodiment of the present invention, the noise monitor includes multi-pass filters that each have reflective surfaces to guide optical energy within a predefined wavelength region through multiple passes of an optical filter. According to a second preferred embodiment of the present invention, the noise monitor includes multi-pass filters each having a serial arrangement of multiple optical filters. The predefined wavelength region of the multi-pass filter is defined by the cumulative selectivity of the multiple optical filters.

DETAILED DESCRIPTION OF THE PREFERRED EMBODIMENT

Figure 1:
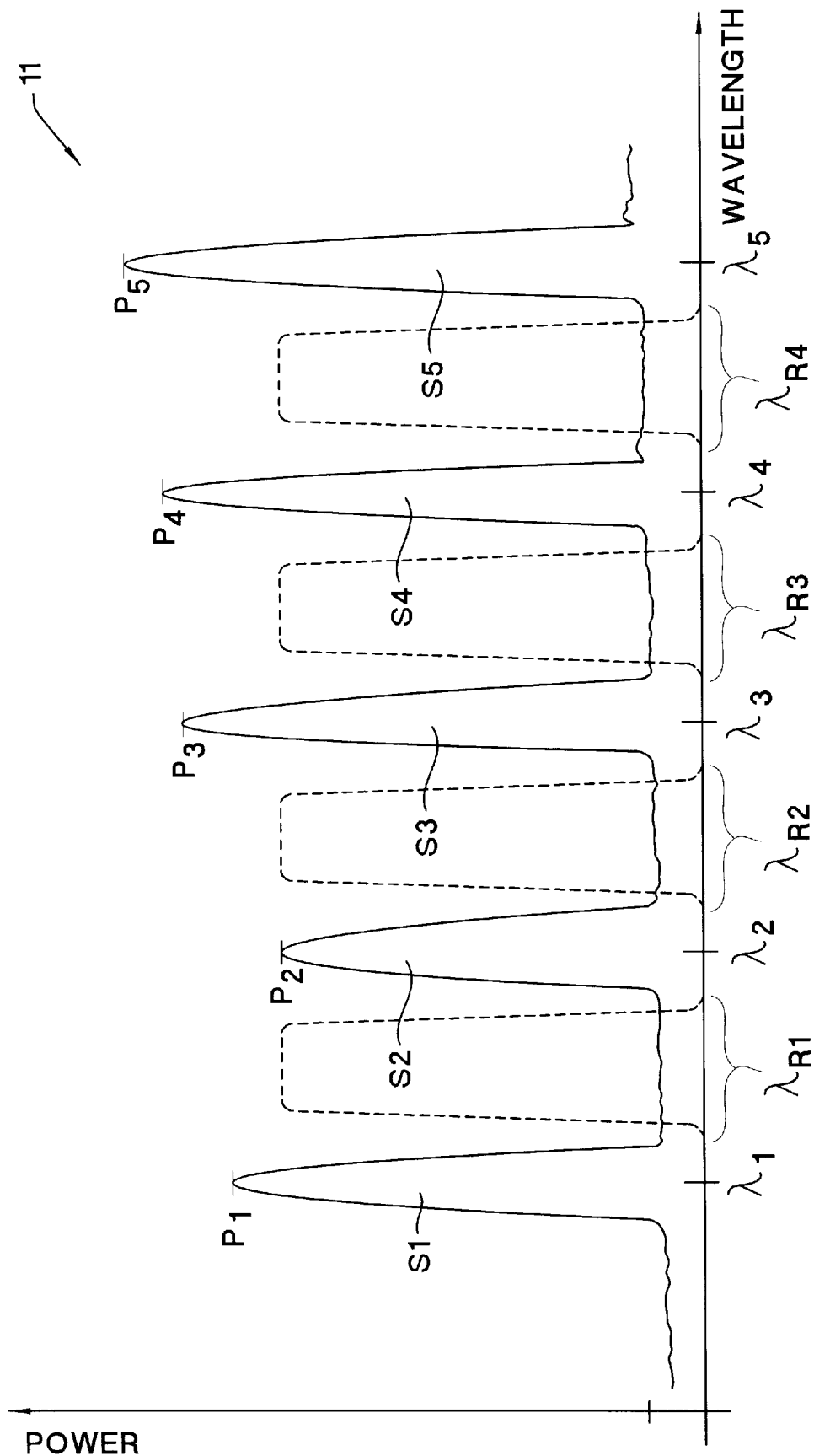
FIG. 1 shows a dense wavelength division multiplexed signal including predefined wavelength regions selected by the optical noise monitors constructed according to the preferred embodiments of the present invention.

FIG. 1 shows a dense wavelength division multiplexed (DWDM) signal 11 present within an optical telecommunication system (not shown). Predefined wavelength regions $\lambda R1-\lambda R4$ are selected by the optical noise monitor constructed according to the preferred embodiments of the present invention. In this example, five channel signals S1–S5 of the DWDM signal 11 are shown and four predefined wavelength regions $\lambda R1-\lambda R4$ are shown interposed between wavelengths $\lambda 1-\lambda 5$ of each of the channel signals S1–S5. Under normal operation of the optical telecommunication system, the noise power within each of the predefined wavelength regions $\lambda R1-\lambda R4$ is within a specified noise level. An increase in noise power above the specified noise level indicates that one or more components of the optical telecommunication system, such as an EDFA, multiplexer or switch are faulty and need adjustment or replacement. Thus, noise monitoring is a valuable diagnostic tool for verifying performance of an optical telecommunication system.

Noise power within each of the predefined wavelength regions $\lambda R1-\lambda R4$ is monitored by filtering optical noise energy within the predefined wavelength regions $\lambda R1-\lambda R4$ and then detecting the total noise power within the predefined wavelength regions $\lambda R1-\lambda R4$ using an optical detector.

Noise power density of the optical energy within each of the predefined wavelength regions also provides a useful measure of performance of the optical telecommunication system. Since the optical detector responds to the total optical noise power within each of the predefined wavelength regions, the noise power density is obtained by first establishing the noise-equivalent bandwidth (NEBW) for each of the predefined wavelength regions selected by the optical noise monitor. The NEBW of each predefined wavelength region is established by applying to the optical noise monitor, a noise signal having known, uniform optical power density over the predefined wavelength regions $\lambda R1-\lambda R4$ and dividing the total noise power within each of the predefined wavelength regions by the optical power density of the applied noise signal. The total optical noise power as sensed by the optical detector is then divided by the NEBW to yield the optical noise power density, for example, the optical power per 0.1 nanometer of optical wavelength.

Signal-to-noise ratio (SNR), another specified operating parameter of the optical telecommunication system, is monitored by comparing the signal power P1–P5 of each of the channel signals S1–S5 to the detected noise power within adjacent predefined wavelength regions $\lambda R1-\lambda R4$, normalized according to the NEBW of each of the predefined wavelength regions.

Typically, the noise floor N is more than 30 dB lower than the power levels P1–P5 of the channel signals S–S5. To accurately distinguish noise power in the predefined wavelength regions $\lambda R1-\lambda R4$ from the power of the channel signals S1–S5, the noise monitor constructed according to the preferred embodiments of the present invention is selective enough to pass optical energy within each of the predefined wavelength regions λR1–λR4 to a detector, while substantially attenuating the level of the channel signals S1–S5 at the detector.

Figure 2:
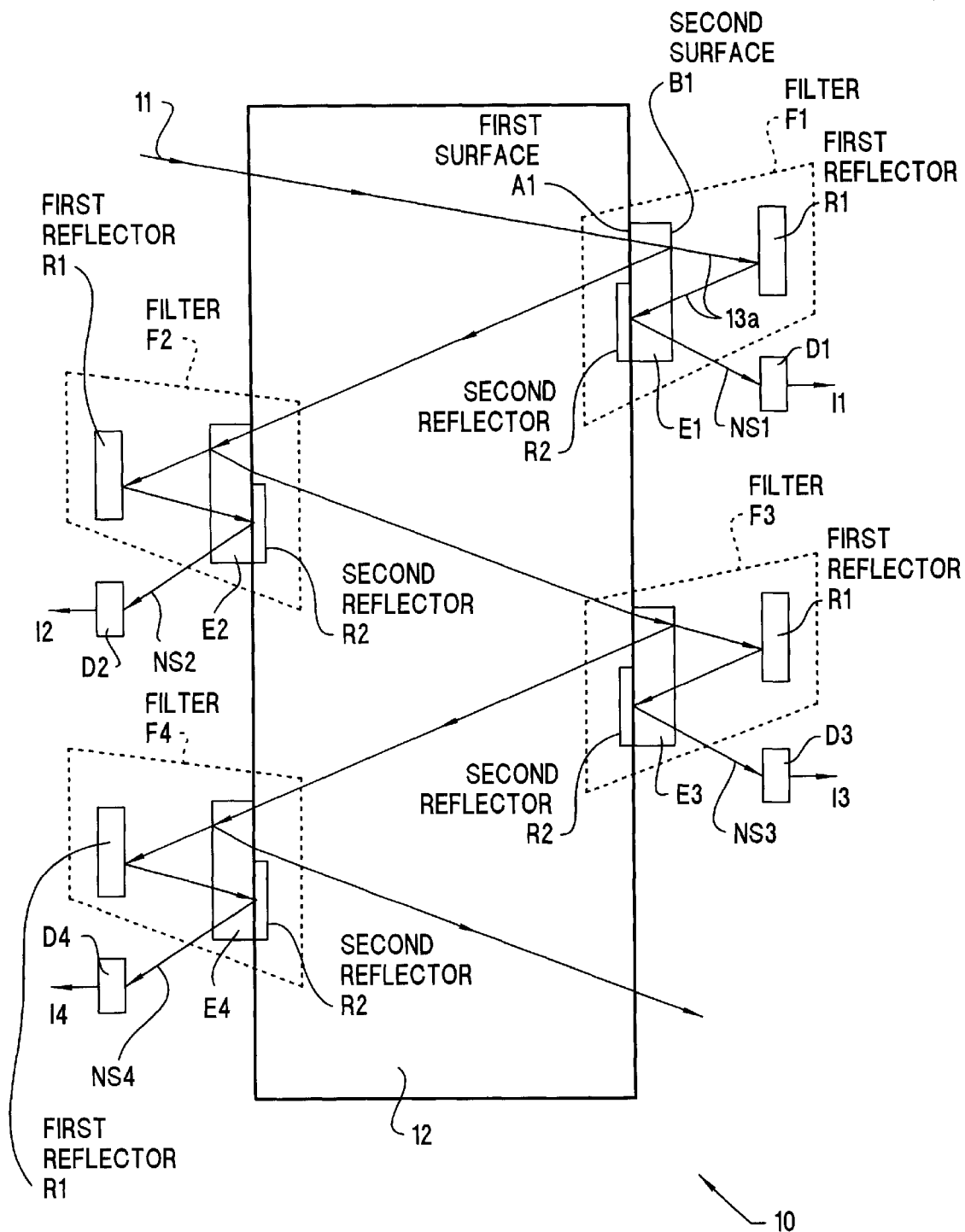
FIG. 2 shows an optical noise monitor constructed according to a first preferred embodiment of the present invention.

FIG. 2 shows an optical noise monitor 10 constructed according to a first preferred embodiment of the present invention. The DWDM signal 11 is incident on an optically transparent member 12, a solid block or frame, supporting a series of multi-pass filters F1–F4. The DWDM signal 11 is then cascaded through the member 12 and is incident on the series of multi-pass filters F1–F4. Each of the multi-pass filters F1–F4 is selective to a distinct one of the predefined wavelength regions λR1–λR4. For example, multi-pass filter F1 is selective to the predefined wavelength region λR1 and transmits optical energy at wavelengths within the predefined wavelength region λR1 to a corresponding detector D1. The multi-pass filter F1 reflects optical energy at wavelengths outside the predefined wavelength region λR1, such as the channel signals S1–S5 and optical energy at wavelengths in the predefined wavelength regions λR2–λR4. Similarly, multi-pass filter F2 reflects optical energy at wavelengths outside the predefined wavelength region λR2 and transmits optical energy at wavelengths within the predefined wavelength region λR2 to optical detector D2. Multi-pass filter F3 reflects optical energy at wavelengths outside the predefined wavelength region λR3 and transmits optical energy at wavelengths within the predefined wavelength region λR3 to optical detector D3. Multi-pass filter F4 reflects optical energy at wavelengths outside the predefined wavelength region λR4 and transmits optical energy at wavelengths within the predefined wavelength region λR4 to optical detector D4. Although each of the multi-pass filters F1–F4 includes various optical elements, as an illustration, the elements are described for the first multi-pass filter F1 in the series. The DWDM signal 11 that propagates through the member 12 is incident on a first surface A1 of the a filter element E1. The filter element E1 is an interference filter such as a Fabry-Perot filter or other type of optical filter having a bandpass optical transmission characteristic. The center wavelength of the filter element E1 is centered within the predefined wavelength region λR1. Optical energy at wavelengths within the passband of the filter element E1 is transmitted through the filter element E1 to a first reflector R1, while optical energy at wavelengths outside the passband of the optical element E1 is reflected and is cascaded to the other optical elements E2–E4 of the multi-pass filters F2–F4 of the series.

The reflector R1 directs the transmitted, band-limited optical energy 13a back to the filter element E1 where it is incident on a second surface B1 of the filter element E1. The optical energy is further band-limited as it propagates through a second pass through the filter element E1. After the second pass through the filter element E1 optical energy is incident on a second reflector R2 adjacent to the first surface A1 of the filter element E1, which directs the optical energy through a third pass through the filter element E1. With each pass through the filter element E1, the optical energy is progressively band-limited to narrower and narrower bandwidths. After a third pass through the filter element E1, the multi-pass filter F1 is selective enough to band-limit the transmission of optical energy to wavelengths within the predefined wavelength region λR1 while rejecting channel signal S1 and channel signal S2 on either side of the predefined wavelength region λR1.

The band-limited noise signal NS1 is incident on optical detector D1 which produces an output current I1 responsive to the total noise power within the predefined wavelength region λR1. The resulting output current I1 indicates the total noise power within the predefined wavelength region λR1 and this noise power is monitored via the output current. Changes in the noise power are used to indicate changes in operating performance of an optical telecommunication system, or to locate faulty components within an optical telecommunication system. Each of the other multi-pass filters F2–F4 in the series have similar reflectors R1, R2 and filter elements E2–E4, except that each of the filter elements E2–E4 has a passband having a center wavelength that is centered within a separate one of the predefined wavelength regions λR2–λR4.

Figure 3:
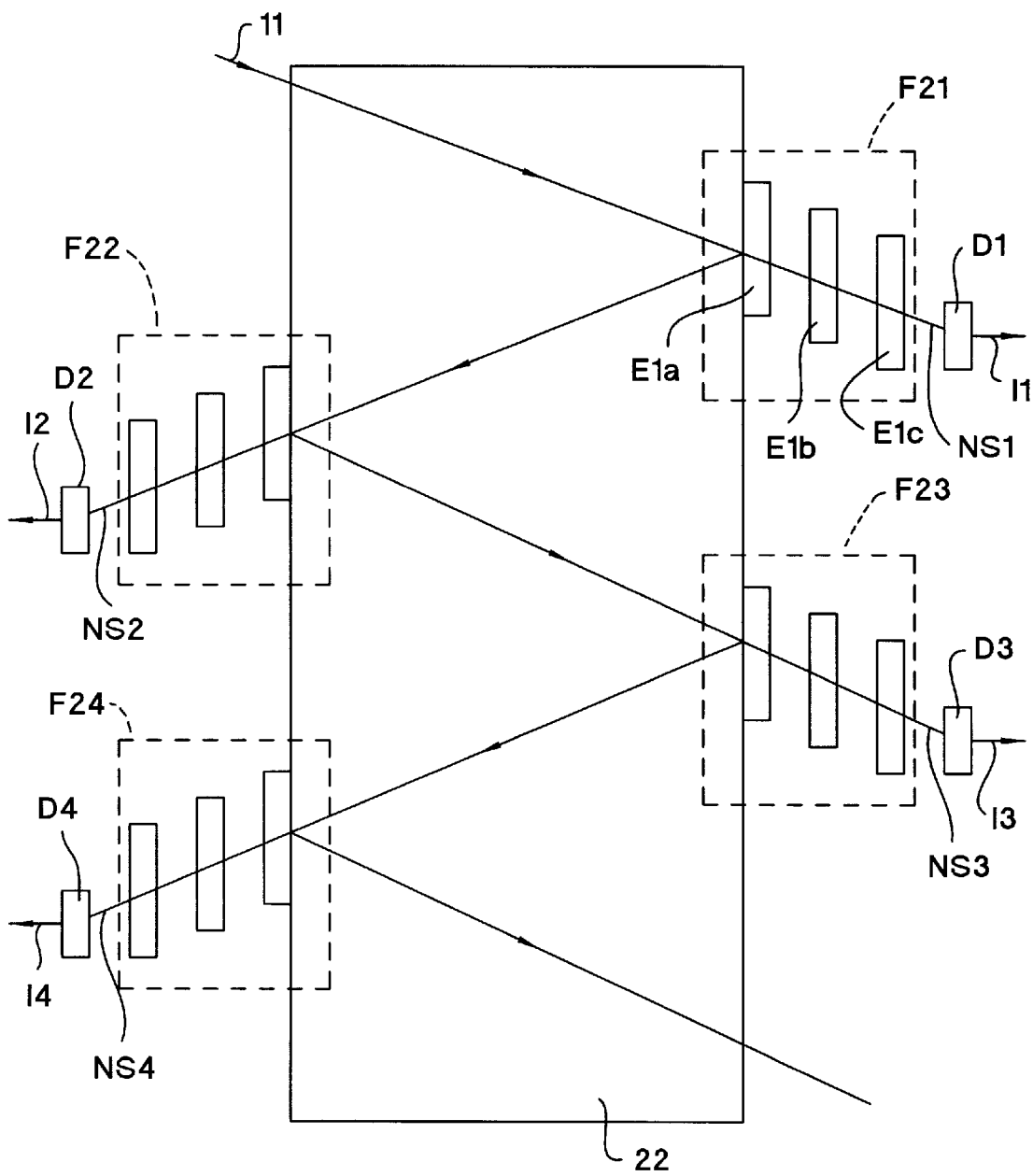
FIG. 3 shows an optical noise monitor constructed according to a second preferred embodiment of the present invention.

FIG. 3 shows an optical noise monitor 20 constructed according to a second preferred embodiment of the present invention. In this preferred embodiment the DWDM signal 11 is incident on an optically transparent member 22, a solid block or frame, supporting a series of multi-pass filters F21–F24. The DWDM signal 11 is then cascaded through the member 22 and is incident on the series of multi-pass filters F21–F24. Each of the multi-pass filters F21–F24 is selective to optical energy at wavelengths within a distinct one of the predefined wavelength regions λR1–λR4. For example, multi-pass filter F21 is selective to the predefined wavelength region λR1 and transmits optical energy at wavelengths within the predefined wavelength region λR1 to a corresponding detector D1. The multi-pass filter F21 reflects optical energy at wavelengths outside the predefined wavelength region λR1, such as the channel signals S1–S5 and optical energy at wavelengths in the predefined wavelength regions λR2–λR4. Similarly, multi-pass filter F22 reflects optical energy at wavelengths outside the predefined wavelength region λR2 and transmits optical energy at wavelengths within the predefined wavelength region λR2 to optical detector D2. Multi-pass filter F23 reflects optical energy at wavelengths outside the predefined wavelength region λR3 and transmits optical energy at wavelengths within the predefined wavelength region λR3 to optical detector D3. Multi-pass filter F24 reflects optical energy at wavelengths outside the predefined wavelength region λR4 and transmits optical energy at wavelengths within the predefined wavelength region λR4 to optical detector D4.

Each of the multi-pass filters F21–F24 includes a cascaded arrangement of optical filter elements and as an illustration, the filter elements are described for the first multi-pass filter F21 in the series. The first multi-pass filter includes three filter elements E1a–E1c. Each of the filter elements E1a–E1c is an interference filter such as a Fabry-Perot filter or other type of optical filter having a bandpass optical transmission characteristic. Optical energy at wavelengths within the passband of the filter element E1a is transmitted through the serial arrangement of filter elements E1a–E1c, while optical energy at wavelengths outside the passband of the optical element E1a is reflected by the filter element E1a and is cascaded to the other multi-pass filters F22–F24 of the series. Alignment of the center wavelengths of the passbands of each of the filter elements E1a–E1c provides for progressive band-limiting of optical energy as the optical energy propagates through each of the filter elements E1a–E1c. Typically, the center wavelength of each of the filter elements E1a–E1c is centered within the predefined wavelength region λR1.

After passing through the third cascaded filter element E1c, the multi-pass filter F21 is selective enough to band-limit the transmission of optical energy to wavelengths within the predefined wavelength region λR1 while rejecting channel signal S1 and channel signal S2 on either side of the predefined wavelength region λR1.

The band-limited noise signal NS1 is incident on optical detector D1 which produces an output current I1 responsive to the total noise power within the predefined wavelength region λR1. The resulting output current I1 indicates the total noise power within the predefined wavelength region λR1 and this noise power is monitored via the output current. Changes in the noise power are used to indicate changes in operating performance of an optical telecommunication system, or to locate faulty components within an optical telecommunication system. Each of the other multi-pass filters F22–F24 in the series have similar filter elements to the filter elements E1a–E1c, except that each of the filter elements included within the multi-pass filters F22–F24 has a passband having a center wavelength that is centered within a separate one of the predefined wavelength regions λR2–λR4.

In the preferred embodiments of the present invention, a parallel arrangement of multi-pass filters is shown. The multi-pass filters are arranged on either side of the optically transmissive member and optical energy outside the passband of each of the optical filter elements in the multi-pass filters is cascaded to successive multi-pass filters in the series along a zig-zag propagation path within the member. The parallel arrangement of multi-pass filters restricts the angular incidence of optical energy on the filter elements, such as interference filters. Alternatively, other arrangements of multi-pass filters are used to cascade the optical energy between successive multi-pass filters in the series.

What is claimed is:

1. An apparatus for monitoring optical noise power within a series of predefined wavelength regions, comprising:

a series of multi-pass filters arranged on an optically transmissive member, each multi-pass filter in the series including, an optical filter element transmissive to optical energy at wavelengths within a passband including a corresponding one of the predefined wavelength regions in the series of predefined wavelength regions, and reflective to optical energy at wavelengths outside the passband, cascading optical energy outside the passband of each of the optical filters to successive multi-pass filters in the series, multiple optically reflective surfaces directing optical energy within the passband through multiple passes through the optical filter element, selectively transmitting through the optical filter element optical energy at wavelengths within the corresponding one of the predefined wavelength regions; and a series of detectors, each detector in the series receiving the selectively transmitted optical energy from a corresponding one of the multi-pass filters and producing an output signal responsive to the optical power within the predefined wavelength region.

2. The apparatus of claim 1 wherein each optical filter element includes an interference filter having a center wavelength coinciding with the wavelength center of a corresponding one of the predefined wavelength regions.

3. The apparatus of claim 1 wherein the optically transmissive member includes a block and the multi-pass filters are arranged on parallel faces of the block cascading the optical energy at wavelengths outside the passband of each of the optical filter elements to successive multi-pass filters in the series along a zig-zag propagation path within the block.

4. The apparatus of claim 3 wherein the multiple optically reflective surfaces include a first reflector receiving optical energy transmitted through a first pass through the optical filter element and directing the optical energy through a second pass through the optical filter element, and a second reflector interposed between the block and the interference filter directing optical energy through a third pass through the optical filter element.

\* \* \* \* \*